United States Patent
Kim et al.

(10) Patent No.: US 9,431,889 B2
(45) Date of Patent: Aug. 30, 2016

(54) ACTIVE RECTIFIER WITH DELAY LOCKED LOOP TO COMPENSATE FOR REVERSE CURRENT LEAKAGE AND WIRELESS POWER RECEIVING APPARATUS INCLUDING ACTIVE RECTIFIER WITH DELAY LOCKED LOOP TO COMPENSATE FOR REVERSE CURRENT LEAKAGE

(75) Inventors: Dong Zo Kim, Yongin-si (KR); Young Tack Hong, Seongnam-si (KR); Jin Sung Choi, Gimpo-si (KR); Young Jin Moon, Gwangju (KR); Sang Wook Kwon, Seongnam-si (KR); Yun Kwon Park, Dongducheon-si (KR); Chang Sik Yoo, Seoul (KR); Eun Seok Park, Suwon-si (KR); Ki Young Kim, Yongin-si (KR); Young Ho Ryu, Yongin-si (KR); Nam Yun Kim, Seoul (KR); Yong Seong Roh, Incheon (KR)

(73) Assignees: Samsung Electronics Co., Ltd., Suwon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 817 days.

(21) Appl. No.: 13/219,842

(22) Filed: Aug. 29, 2011

(65) Prior Publication Data

US 2012/0051109 A1    Mar. 1, 2012

(30) Foreign Application Priority Data

Aug. 27, 2010  (KR) .................. 10-2010-0083311

(51) Int. Cl.
*H02M 7/217* (2006.01)
*H02M 1/08* (2006.01)

(52) U.S. Cl.
CPC ............ *H02M 1/083* (2013.01); *H02M 7/217* (2013.01)

(58) Field of Classification Search
CPC .. H02M 7/219; H02M 7/217; H02M 7/1626; H02M 1/4225; H02M 1/32; H02M 3/33592; H02M 1/083; Y02B 70/126; Y02B 70/1475
USPC ................. 363/81, 84, 87, 89, 125, 127
See application file for complete search history.

(56) References Cited

U.S. PATENT DOCUMENTS

| | | |
|---|---|---|
| 3,940,682 A | 2/1976 | Park et al. |
| 5,892,606 A | 4/1999 | Fatehi et al. |

(Continued)

FOREIGN PATENT DOCUMENTS

| | | |
|---|---|---|
| CN | 1289476 A | 3/2001 |
| CN | 101527566 A | 9/2009 |

(Continued)

OTHER PUBLICATIONS

International Search Report mailed Apr. 27, 2012, issued in counterpart International Patent Application No. PCT/KR2011/006321; 3 pages.

(Continued)

*Primary Examiner* — Nguyen Tran
*Assistant Examiner* — Gustavo Rosario Benitez
(74) *Attorney, Agent, or Firm* — NSIP Law

(57) ABSTRACT

An active rectifier and a wireless power receiver including the active rectifier are provided. According to an aspect, an active rectifier may include: a first loop configured to provide voltage when the phase of an input signal is positive; and a second loop configured to provide voltage when the phase of the input signal is negative, wherein the first loop and the second loop include a delay locked loop configured to compensate for reverse current leakage due to a delay of a switch included therein.

13 Claims, 16 Drawing Sheets

(56) References Cited

U.S. PATENT DOCUMENTS

| | | |
|---|---|---|
| 6,134,131 A | 10/2000 | Poon et al. |
| 6,275,401 B1 | 8/2001 | Xia |
| 6,324,084 B1 * | 11/2001 | Fujisawa ................... 363/127 |
| 6,373,790 B1 * | 4/2002 | Fujisawa ............ H02M 7/219 320/134 |
| 2002/0012260 A1 * | 1/2002 | Jain et al. .................. 363/127 |
| 2002/0031160 A1 | 3/2002 | Desor |
| 2008/0211473 A1 * | 9/2008 | Tlasksl et al. ............ 323/283 |
| 2008/0238390 A1 | 10/2008 | Trivedi et al. |
| 2008/0242246 A1 | 10/2008 | Minnis et al. |
| 2010/0165686 A1 | 7/2010 | Matzberger et al. |

FOREIGN PATENT DOCUMENTS

| | | |
|---|---|---|
| CN | 101645619 A | 2/2010 |
| JP | 09-308231 | 11/1997 |
| JP | 2001-251861 | 9/2001 |
| JP | 2003309978 A | 10/2003 |
| JP | 2010104159 A | 5/2010 |
| KR | 10-2005-0112840 A | 12/2005 |

OTHER PUBLICATIONS

Chinese Office Action mailed Aug. 29, 2014 in counterpart Chinese Application No. 20118041374.2 (32 pages, in Chinese, with complete English translation).

Japanese Office Action issued by the Japanese Patent Office on May 12, 2015 for the corresponding Japanese Patent Application No. 2013-527004. ( 4 pages in English, 4 pages in Japanese).

Office Action issued by the SIPO on Oct. 14, 2015 for the corresponding CN patent application No. 201180041374.2, 21 pages in English, 12 pages in Chinese.

* cited by examiner

FIG. 4
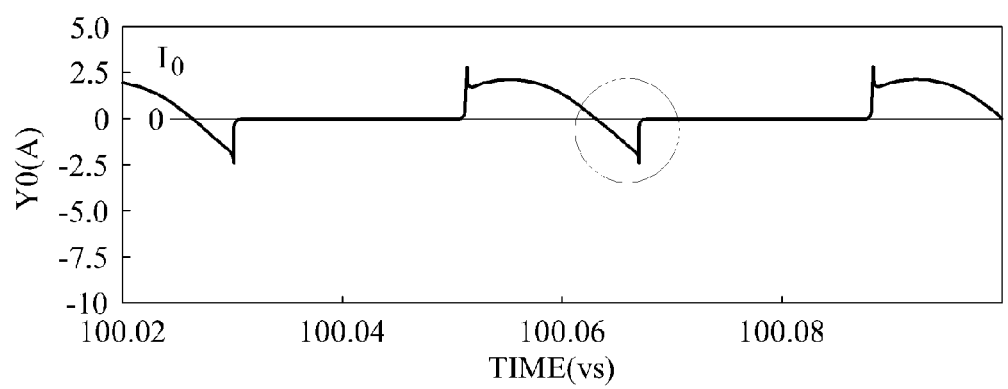
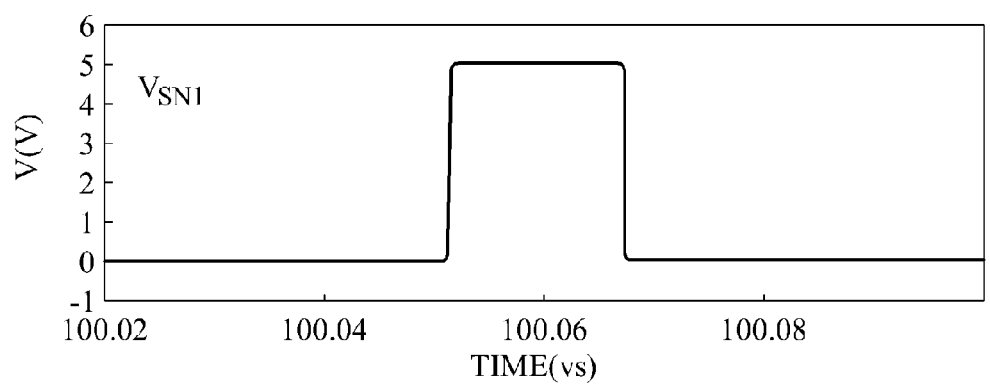

FIG. 6
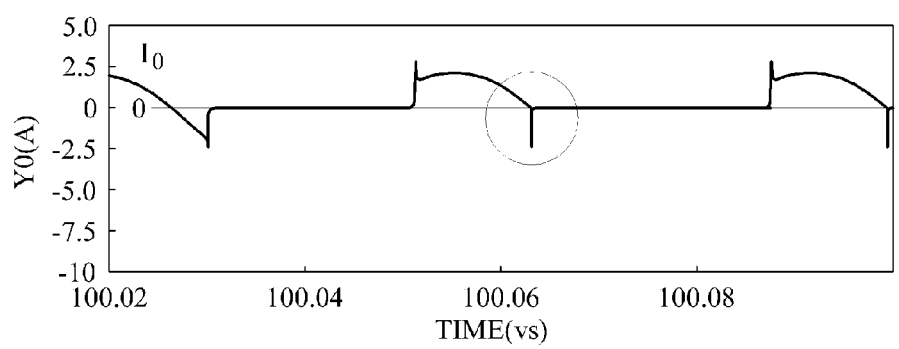
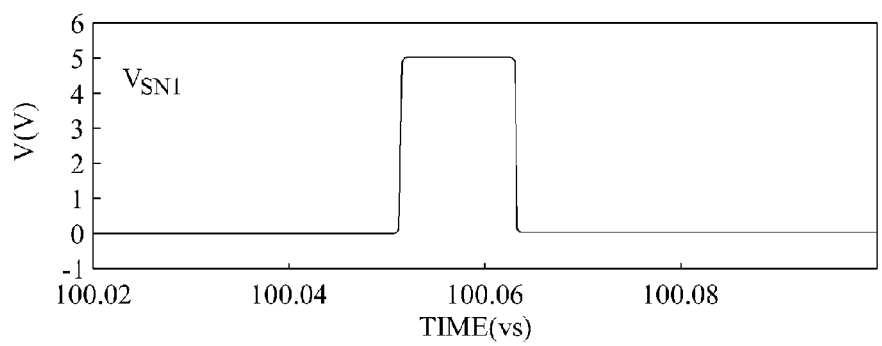

ACTIVE RECTIFIER WITH DELAY LOCKED LOOP TO COMPENSATE FOR REVERSE CURRENT LEAKAGE AND WIRELESS POWER RECEIVING APPARATUS INCLUDING ACTIVE RECTIFIER WITH DELAY LOCKED LOOP TO COMPENSATE FOR REVERSE CURRENT LEAKAGE

CROSS-REFERENCE TO RELATED APPLICATION(S)

This application claims the benefit under 35 U.S.C. §119 (a) of Korean Patent Application No. 10-2010-0083311, filed on Aug. 27, 2010, in the Korean Intellectual Property Office, the entire disclosure of which is incorporated herein by reference for all purposes.

BACKGROUND

1. Field

The following description relates to an active rectifier which may be used for wireless power transmission.

2. Description of Related Art

A resonance power transferring system is one of several wireless power transmission systems, and may include a source device that transmits the resonance power and a target device that receives the resonance power. The resonance power may be wirelessly transmitted from the source device to the target device.

When a wireless power receiver corresponding to a target device of the wireless power transmission system uses a passive rectifier, the passive rectifier may rectify alternating current to have a voltage equal to a value obtained by subtracting a voltage drop from a peak voltage of an input, due to the voltage drop caused by a diode included in the rectifier. The rectifier in the wireless power receiver may be an important factor for power transmission efficiency.

SUMMARY

According to an aspect, an active rectifier may include: a first loop configured to provide voltage when the phase of an input signal is positive; and a second loop configured to provide voltage when the phase of the input signal is negative, wherein the first loop and the second loop include a delay locked loop configured to compensate for reverse current leakage due to a delay of a switch included therein.

The input signal may be received from a source resonator through magnetic coupling.

The first loop may include: a first switch configured to be turned on when the phase of the input signal is positive, based on a differential signal with respect to the input signal; a first delay switch to be turned on when the phase of the input signal is positive, based on the differential signal with respect to the input signal; a first delay locked loop configured to compensate for a delay, between when a phase of the differential signal is switched from positive to negative and when the first delay switch is turned on; and a capacitor configured to provide a voltage corresponding to substantially the maximum amplitude of the input signal.

The first delay switch may include: a comparator configured to receive the differential signal and to output a predetermined voltage when the phase of the differential signal is negative; a voltage buffer configured to store the predetermined voltage outputted from the comparator, and, when the stored voltage becomes a predetermined turn-on voltage, to output the turn-on voltage; and a transistor that is configured to be turned on by the turn-on voltage outputted from the voltage buffer, wherein the first delay locked loop is configured to provide a voltage offset corresponding to a delay occurring due to the comparator and the voltage buffer, and adds the voltage offset to the phase of the differential signal inputted to the comparator.

The first delay locked loop may include: a second comparator configured to receive the differential signal, and to output a predetermined voltage when the phase of the differential signal is negative; a delay unit configured to receive the output of the voltage buffer, and to output the received output after adding a predetermined delay of the second comparator to the received output; a phase detecting unit configured to detect a phase difference between an output signal of the second comparator and an output signal of the delay unit; an electric charge pump configured to provide the voltage offset corresponding to the phase difference; and a delay compensation unit configured to add the voltage offset to the phase of the differential signal inputted to the comparator.

The second loop may include: a second switch configured to be turned on when the phase of the input signal is negative; a second delay switch configured to be turned on when the phase of the input signal is negative; a second delay locked loop configured to compensate for a delay, between when the phase of the input signal is switched from positive to negative and when the second delay switch is turned on; and a capacitor configured to provide voltage corresponding to the maximum amplitude of the input signal.

The second delay switch may include: a comparator configured to receive the input signal, and to output a predetermined voltage when the phase of the input signal is negative; a voltage buffer configured to store the predetermined voltage outputted from the comparator, and, when the stored voltage becomes a predetermined turn-on voltage, to output the turn-on voltage; and a transistor configured to be turned on by the turn-on voltage outputted from the voltage buffer, wherein the second delay locked loop is configured to provide a voltage offset corresponding to a delay occurring due to the comparator and the voltage buffer, and to add the voltage offset to the phase of the input signal inputted to the comparator.

The second delay locked loop may include: a second comparator configured to receive the input signal, and to output a predetermined voltage when the phase of the input signal is negative; a delay unit configured to receive the output of the voltage buffer, and to output the received output after adding a predetermined delay of the second comparator to the received output; a phase detecting unit configured to detect a phase difference between an output signal of the second comparator and an output signal of the delay unit; an electric charge pump configured to provide the voltage offset corresponding to the phase difference; and a delay compensation unit configured to add the voltage offset to the phase of the input signal inputted to the comparator.

According to another aspect, a wireless power receiver may include: a target resonator configured to receive electromagnetic energy from a source resonator; an active rectifier configured to generate a DC signal by rectifying an AC signal received by the target resonator; and a DC-DC converter to output a rectified voltage by adjusting a signal level of the DC signal, wherein the active rectifier includes a delay locked loop that is configured to compensate for reverse current leakage due to a delay of a switch included in the active rectifier.

The active rectifier may include: a first loop configured to provide voltage when phase of the AC signal is positive; and a second loop configured to provide voltage when the phase of the AC signal is negative, wherein the first loop and the second loop include a delay locked loop that is configured to compensates for a reverse current leakage due to a delay of a switch included therein.

The first loop may include: a first switch configured to be turned on in a section where the phase of the AC signal is positive, based on a differential signal with respect to the AC signal; a first delay switch configured to be turned on in the section where the phase of the AC signal is positive, based on the differential signal with respect to the AC signal; a first delay locked loop configured to compensate for a delay, between when a phase of the differential signal is switched from positive to negative and when the first delay switch is turned on; and a capacitor configured to provide a DC voltage corresponding to substantially the maximum amplitude of the AC signal.

The second loop may include: a second switch configured to be turned on when the phase of the AC signal is negative; a second delay switch configured to be turned on when the phase of the AC signal is negative; a second delay locked loop configured to compensate for a delay, between when the phase of the AC signal switched from positive to negative and when the second delay switch is turned on; and a capacitor configured to provide a DC voltage corresponding to substantially the maximum amplitude of the AC signal.

According to yet another aspect, an active rectifier may include: a first circuit configured to provide voltage when the phase of an input signal is positive; and a second circuit configured to provide voltage when the phase of the input signal is negative, wherein the first circuit, the second circuit, or both include a delay locked circuit that is configured to compensate for reverse current leakage therein.

The first circuit, the second circuit, or both may include at least one switch and the delay locked circuit of one or both of the first circuit and the second circuit is configured to compensate for reverse current leakage due to a delay of the at least one switch.

The at least one switch may include a transistor. And the transistor may include a PMOS or NMOS transistor.

The first circuit, the second circuit, or both may include: a switch configured to be turned on when the phase of the input signal is positive, based on a differential signal with respect to the input signal; a delay switch to be turned on when the phase of the input signal is positive, based on the differential signal with respect to the input signal; and a capacitor configured to provide a voltage corresponding to substantially the maximum amplitude of the input signal, wherein the delay locked circuit is configured to compensate for a delay, between when a phase of the differential signal is switched from positive to negative and when the delay switch is turned on.

The delay switch may include: a comparator configured to receive the differential signal and to output a predetermined voltage when the phase of the differential signal is negative; a voltage buffer configured to store the predetermined voltage outputted from the comparator, and, when the stored voltage becomes a predetermined turn-on voltage, to output the turn-on voltage; and a transistor configured to be turned on by the turn-on voltage outputted from the voltage buffer, wherein the delay locked circuit is configured to provide a voltage offset corresponding to a delay occurring due to the comparator and the voltage buffer, and to add the voltage offset to the phase of the differential signal inputted to the comparator.

The delay locked circuit may include: a second comparator configured to receive the differential signal, and to output a predetermined voltage when the phase of the differential signal is negative; a delay unit configured to receive the output of the voltage buffer, and to output the received output after adding a predetermined delay of the second comparator to the received output; a phase detecting unit configured to detect a phase difference between an output signal of the second comparator and an output signal of the delay unit; an electric charge pump configured to provide the voltage offset corresponding to the phase difference; and a delay compensation unit configured to add the voltage offset to the phase of the differential signal inputted to the comparator.

An electronic device may include the active rectifier.

Other features and aspects may be apparent from the following detailed description, the drawings, and the claims.

BRIEF DESCRIPTION OF THE DRAWINGS

FIG. 4 is a diagram illustrating a simulation of the active rectifier of FIG. 2;

FIG. 6 is a diagram illustrating a simulation of the active rectifier of FIG. 5;

Figure 1:
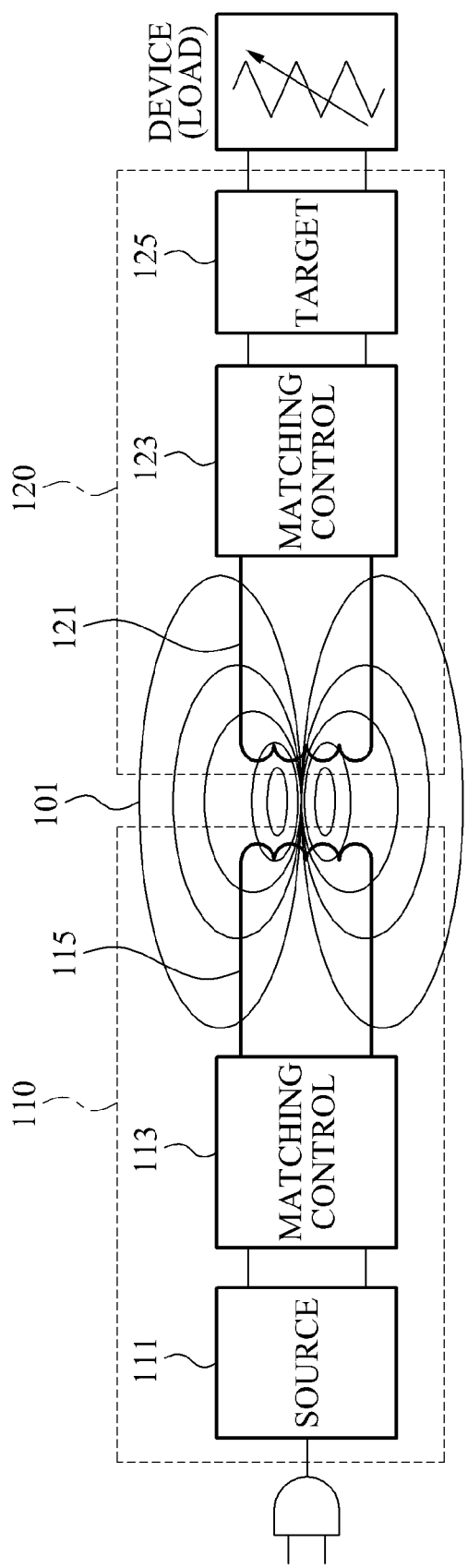
FIG. 1 is a diagram illustrating a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

One or more embodiments may provide an active rectifier that compensates for a reverse current leakage using a delay locked loop. In some embodiments, the active rectifier may be used with a wireless power receiver of a wireless power transmission system. Of course, it will be appreciated that the active rectifier may be used in other electronic devices where power rectification may be required.

FIG. 1 illustrates a wireless power transmission system.

The wireless power transmitted may be resonance power. As shown in FIG. 1, the wireless power transmission system may have a source-target structure including a source and a target. For example, the wireless power transmission system may include a resonance power transmitter 110 corresponding to the source and a resonance power receiver 120 corresponding to the target.

The resonance power transmitter 110 may include a source unit 111 and a source resonator 115. The source unit 111 may be configured to receive energy from an external voltage supplier to generate a resonance power. In some instances, the resonance power transmitter 110 may further include a matching control 113 to perform resonance frequency and/or impedance matching.

The source unit 111 may include an alternating current (AC)-to-AC (AC/AC) converter, an AC-to-direct current (DC) (AC/DC) converter, and a (DC/AC) inverter. The AC/AC converter may be configured to adjust, to a desired level, a signal level of an AC signal input from an external device. The AC/DC converter may output a DC voltage at a predetermined level, for instance, by rectifying an AC signal output from the AC/AC converter. The DC/AC inverter may be configured to generate an AC signal (e.g., in a band of a few megahertz (MHz) to tens of MHz) by quickly switching a DC voltage output from the AC/DC converter. Other frequencies of AC power are also possible.

The matching control 113 may be configured to set at least one of a resonance bandwidth of the source resonator 115 and an impedance matching frequency of the source resonator 115. In some implementations, the matching control 113 may include at least one of a source resonance bandwidth setting unit and a source matching frequency setting unit. And the source resonance bandwidth setting unit may set the resonance bandwidth of the source resonator 115. The source matching frequency setting unit may set the impedance matching frequency of the source resonator 115. For example, a Q-factor of the source resonator 115 may be determined based on setting of the resonance bandwidth of the source resonator 115 or setting of the impedance matching frequency of the source resonator 115.

The source resonator 115 may be configured to transfer electromagnetic energy to a target resonator 121. For example, the source resonator 115 may transfer the resonance power to the resonance power receiver 120 through magnetic coupling 101 with the target resonator 121. Accordingly, the source resonator 115 may be configured to resonate within the set resonance bandwidth.

As shown, the resonance power receiver 120 may include the target resonator 121, a matching control 123 to perform resonance frequency or impedance matching, and a target unit 125 to transfer the received resonance power to a device or a load.

The target resonator 121 may be configured to receive the electromagnetic energy from the source resonator 115. The target resonator 121 may be configured to resonate within the set resonance bandwidth.

The matching control 123 may set at least one of a resonance bandwidth of the target resonator 121 and an impedance matching frequency of the target resonator 121. In some instances, the matching control 123 may include a target resonance bandwidth setting unit, a target matching frequency setting unit, or both. The target resonance bandwidth setting unit may set the resonance bandwidth of the target resonator 121. The target matching frequency setting unit may set the impedance matching frequency of the target resonator 121. For example, a Q-factor of the target resonator 121 may be determined based on setting of the resonance bandwidth of the target resonator 121 and/or setting of the impedance matching frequency of the target resonator 121.

The target unit 125 may be configured to transfer the received resonance power to the device or load. The target unit 125 may include an AC/DC converter and a DC/DC converter. The AC/DC converter may generate a DC voltage by rectifying an AC signal transmitted from the source resonator 115 to the target resonator 121. And the DC/DC converter may supply a rated voltage to a device or the load by adjusting the voltage level of the DC voltage.

For example, the AC/DC converter may be configured as an active rectifier utilizing a delay locked loop.

In one or more embodiments, the source resonator 115 and the target resonator 121 may be configured as a helix coil structured resonator, a spiral coil structured resonator, a meta-structured resonator, or the like.

Referring to FIG. 1, controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121 in some instances. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

For wireless power transmission employing a resonance scheme, the resonance bandwidth may be an important factor. When the Q-factor (e.g., considering a change in a distance between the source resonator 115 and the target resonator 121, a change in the resonance impedance, impedance mismatching, a reflected signal, and/or the like), is Qt, Qt may have an inverse-proportional relationship with the resonance bandwidth, as given by Equation 1.

$$\frac{\Delta f}{f_0} = \frac{1}{Qt} \qquad [\text{Equation 1}]$$
$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. The BW-factor may indicate either $1/BW_S$ or $1/BW_D$.

Due to one or more external effects, for example, a change in the distance between the source resonator 115 and the target resonator 121, a change in a location of at least one of the source resonator 115 and the target resonator 121, and/or the like, impedance mismatching between the source resonator 115 and the target resonator 121 may occur. The impedance mismatching may be a direct cause in decreasing an efficiency of power transfer. When a reflected wave corresponding to a transmission signal that is partially reflected and returned is detected, the matching control 113 may be configured to determine the impedance mismatching has occurred, and may perform impedance matching. The matching control 113 may change a resonance frequency by detecting a resonance point through a waveform analysis of the reflected wave. The matching control 113 may determine, as the resonance frequency, a frequency having the minimum amplitude in the waveform of the reflected wave.

The source resonator 115 and/or the target resonator 121 in FIG. 1 may have a resonator structure illustrated in FIGS. 8 through 14.

Figure 2:
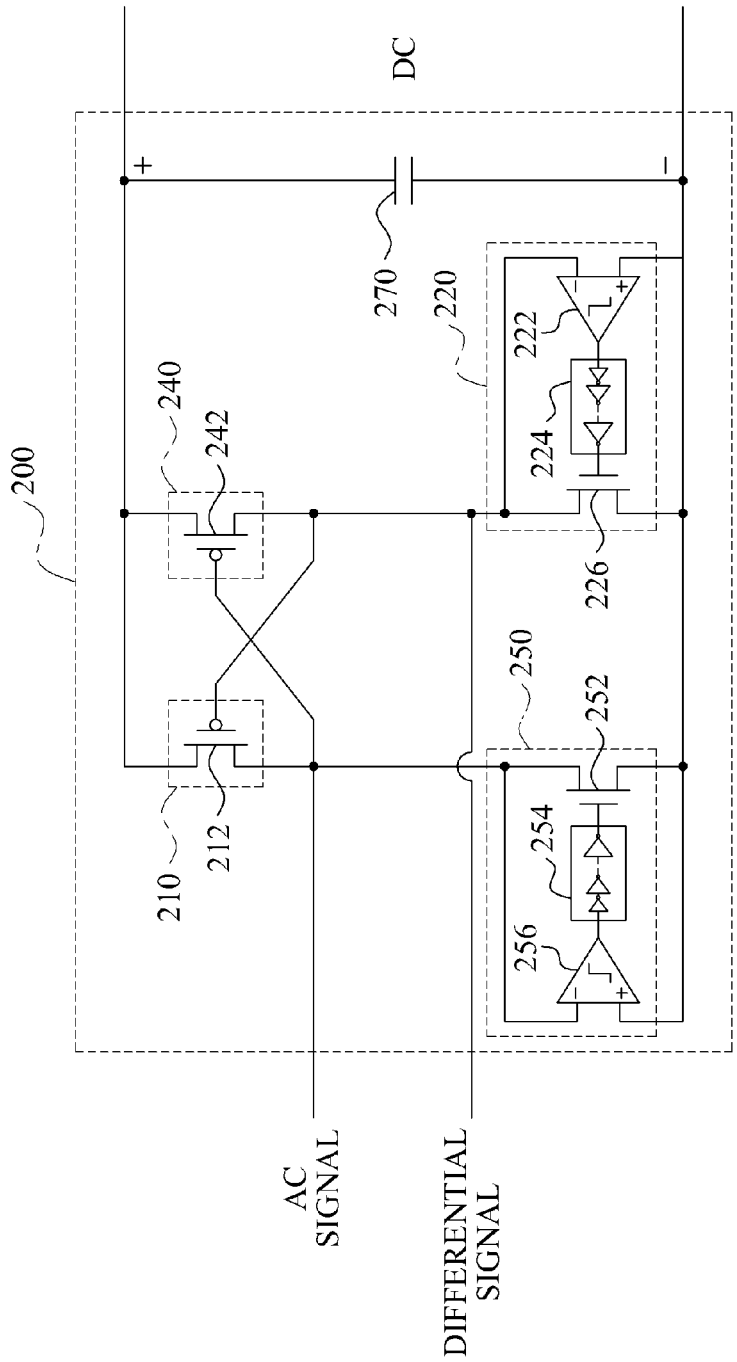
FIG. 2 is a diagram illustrating an active rectifier.

FIG. 2 illustrates an active rectifier 200. As shown, the active rectifier 200 may include a first loop and a second loop. The first and second loops may be circuitry. The first loop may be configured to provide voltage when a phase of an input AC signal is positive, and the second loop may be configured to provide voltage when the phase of the input AC signal is negative. The first loop may include a first switch 210, a first delay switch 220, and a capacitor 270. In some embodiments, the first switch 210 may include a p-channel metal-oxide semiconductor (PMOS) transistor 212, and may be turned "on" (or otherwise activated) when the phase of the input AC signal is positive, based on a differential signal with respect to the input AC signal. The first delay switch 220 may be turned "on" in the section when the phase of the AC signal is positive, based on the differential signal with respect to the AC signal. The capacitor 270 may be configured to provide a DC voltage corresponding to substantially the maximum amplitude of the AC signal.

The first delay switch 220 may include a comparator 222, a voltage buffer 224, and a transistor 226. The comparator 222 may receive the differential signal and may output a predetermined voltage when the phase of the differential signal is negative. The voltage buffer 224 may be configured to store the predetermined voltage outputted from the comparator 222, and, when the stored voltage becomes a predetermined turn-on voltage, may output the turn-on voltage. The transistor 226 may be turned "on" based on the turn-on voltage outputted from the voltage buffer 224. In some embodiments, the transistor 226 may correspond to an n-channel metal-oxide semiconductor (NMOS) transistor.

The second loop may include a second switch 240, a second delay switch 250, and a capacitor 270. For example, the second switch 240 may include a PMOS transistor 242, and may be turned "on" when the phase of the AC signal is negative. The second delay switch 250 may be turned "on" when the phase of the input AC signal is negative. The capacitor 270 may provide a DC voltage corresponding to substantially the maximum amplitude of the AC signal.

The second delay switch 250 may include a comparator 252, a voltage buffer 254, and a transistor 256. The comparator 252 may receive the AC signal as an input, and may output a predetermined voltage in the section where the phase of the AC signal is negative. The voltage buffer 254 may store a predetermined voltage outputted from the comparator 252, and, when the storage voltage becomes a predetermined turn-on voltage, may output the turn-on voltage. The transistor 256 may be turned on or otherwise actuated by the turn-on voltage outputted from the voltage buffer 254. In some embodiments, the transistor 256 may correspond to an NMOS transistor.

Figure 3:
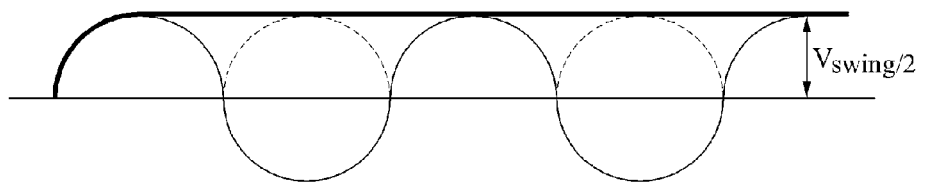
FIG. 3 is a diagram illustrating rectification using an active rectifier.

FIG. 3 illustrates rectification using an active rectifier. Referring to FIG. 3, voltage drop may not occur in the active rectifier. Thus, a voltage V may be rectified to a voltage of $(V_{swing}/2)V$. $V_{swing}$ denotes peak-to-peak swing of an inputted AC power.

Accordingly, when the voltage drop of the rectifier is removed, efficiency of the rectifier may be maximized. However, unlike conventional passive rectifiers, reverse current leakage may occur in the active rectifier.

FIG. 4 illustrates a simulation of the active rectifier of FIG. 2. In FIG. 4, the circle denotes a portion where reverse current leakage occurs. In the active rectifier 200, reverse current leakage may cause a delay between a comparator and a voltage buffer. For example, referring to FIG. 2, the comparator may include the comparator 222 and/or the comparator 252, and the voltage buffer may include the voltage buffer 224 and/or the voltage buffer 254. One or more switches include in the active rectifier may not be turned "off" at the appropriate time due to the delay, and thus reverse current leakage may occur. The switches may be transistors, for instance. As shown in FIG. 2, the transistor may be the transistor 226 and/or the transistor 256. The reverse current leakage may cause power loss and thus, high power conversion efficiency may not be realized.

Figure 5:
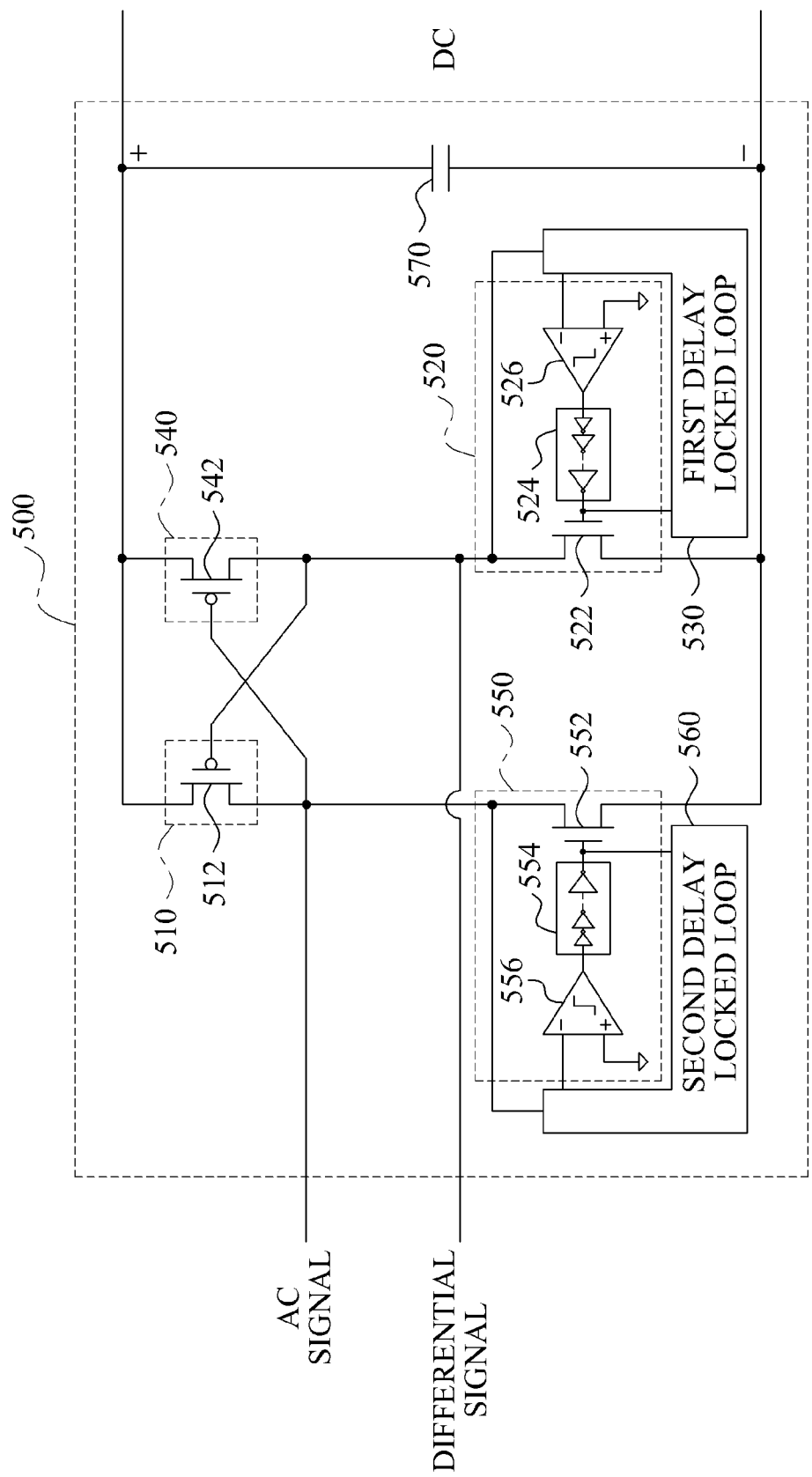
FIG. 5 is a diagram illustrating an active rectifier having a delay locked loop.

According to one or more embodiments, the reverse current leakage occurring in the active rectifier 220 may be overcome using a delay locked loop of FIG. 5.

FIG. 5 illustrates an active rectifier 500 having a delay locked loop.

As shown, the active rectifier 500 may include a first loop and a second loop. The first and second loops may be circuitry. The first loop may be configured to provide voltage when the phase of an input AC signal is positive, and the second loop may provide voltage when the phase of the input AC signal is negative. One or both of the first loop and the second loop may include a delay locked loop that is configured to compensate for a reverse current leakage caused by a delay of a switch included in the first loop and/or the second loop of the active rectifier. The delay locked loop may be circuitry, for instance.

As shown, the first loop may include a first switch 510, a first delay switch 520, a first delay locked loop 530, and a capacitor 570. For example, the first switch 510 may include a transistor 512, and may be turned on or otherwise actuated when the phase of the input AC signal is positive, based on a differential signal with respect to the AC signal. Transistor 512 may be a PMOS transistor, for example. The first delay switch 520 may be turned on when the phase of the AC signal is positive, based on the differential signal with respect to the input AC signal. The first delay locked loop 530 may be configured to compensate for a delay, between when a phase of the differential is switched from positive to negative and when the first delay switch 520 is turned on. The capacitor 570 may be configured to provide a DC voltage corresponding to the maximum amplitude of the AC signal.

The first delay switch 520 may include a comparator 526, a voltage buffer 524, and a transistor 522. The comparator 526 may receive the differential signal, and may output a predetermined voltage when the phase of the differential signal is negative. The voltage buffer 524 may store the predetermined voltage outputted from the comparator 526, and, when the stored voltage becomes a predetermined turn-on voltage, may output the turn-on voltage. The transistor 522 and may be turned on based on the turn-on voltage outputted from the voltage buffer 524. In some instances, transistor 522 may be a NMOS transistor.

The first delay locked loop 530 may be configured to generate or provide a voltage offset corresponding to a delay caused by the comparator 526 and the voltage buffer 524, and add the voltage offset to the phase of the differential signal inputted to the comparator 526.

The second loop may include a second switch 540, a second delay switch 550, a second delay locked loop 560, and a capacitor 570. For example, the second switch 540 may include a transistor 542, and may be turned on when the phase of the input AC signal is negative. Transistor 542 may be a PMOS transistor, for example. The second delay switch 550 may be turned on when the phase of the input AC signal is negative. The second delay locked loop 560 may be configured to compensate for a delay, between when the phase of the AC signal is switched from positive to negative and when the second delay switch 550 is turned on. The capacitor 570 may be configured to provide a DC voltage corresponding to substantially the maximum amplitude of the AC signal.

The second delay switch 550 may include a comparator 556, a voltage buffer 554, and a transistor 552. The comparator 556 may receive the AC signal as an input, and may output a predetermined voltage in the section when the phase of the AC signal is negative. The voltage buffer 554 may store the predetermined voltage outputted from the comparator 556, and, when the stored voltage becomes a predetermined turn-on voltage, may output the turn-on voltage. The transistor 552 and may be turned on by the turn-on voltage outputted from the voltage buffer 554. In some instances, transistor 552 may be a NMOS transistor. The second delay locked loop 560 may generate or provide a voltage offset corresponding to a delay caused by the comparator 556 and the voltage buffer 554, and may add the voltage offset to the phase of the AC signal inputted to the comparator 556.

FIG. 6 illustrates simulation results of the active rectifier 500 of FIG. 5. As will be appreciated, the active rectifier 500 may be configured to substantially compensate for the reverse current leakage using a voltage offset corresponding to a delay that is obtained using a delay locked loop, for example, the delay locked loop 530 and the delay locked loop 560.

Figure 7:
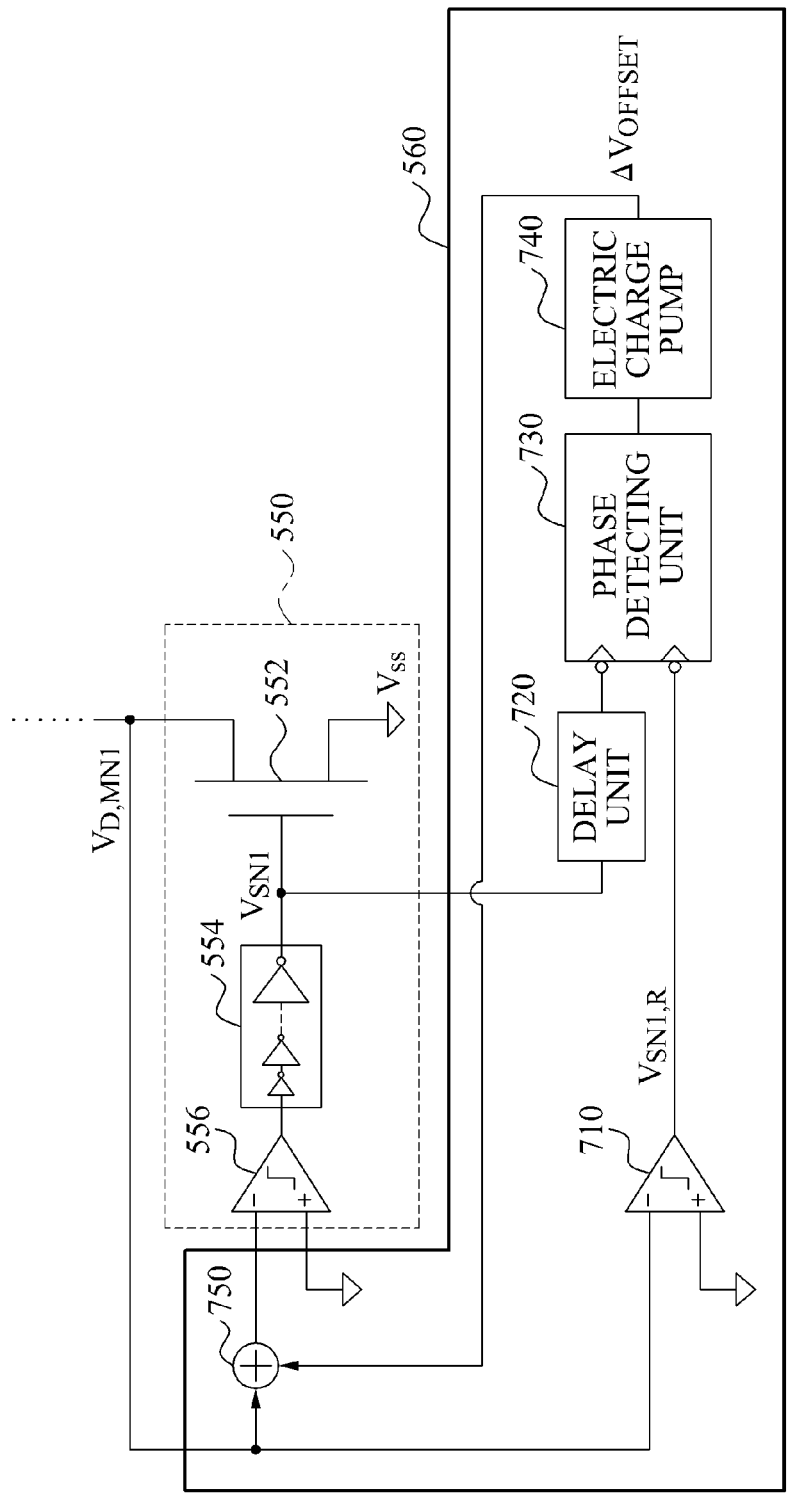
FIG. 7 is a diagram illustrating a delay locked loop in the active rectifier.

FIG. 7 illustrates one embodiment of the second delay locked loop 560 for use in the active rectifier 500 of FIG. 5. As shown, the second delay locked loop 560 may include a second comparator 710, a delay unit 720, a phase detecting unit 730, an electric charge pump 740, and a delay compensation unit 750.

The second comparator 710 may receive an AC signal as an input, and may output a predetermined voltage in a section when the phase of the input AC signal is negative. The delay unit 720 may receive an output of the voltage buffer 554 and may output the received output after adding a predetermined delay corresponding to the second comparator 710 to the received output. The phase detecting unit 730 may be configured to detect a phase difference between an output signal of the second comparator 710 and an output signal of the delay unit 720, and may transmit the phase difference to the electric charge pump 740. The electric charge pump 740 may provide a voltage offset corresponding to the phase difference detected from the phase detecting unit 730. The delay compensation unit 750 may provide, to the comparator 556, the voltage offset after adding the phase of the AC signal inputted to the comparator 556 to the voltage offset.

The first delay locked loop 530 may also be embodied in the same manner as the delay locked loop of FIG. 7 in some embodiments.

Referring again to FIG. 1, the source resonator 115 and/or the target resonator 121 may be configured as a helix coil structured resonator, a spiral coil structured resonator, a meta-structured resonator, and the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

Figure 8:
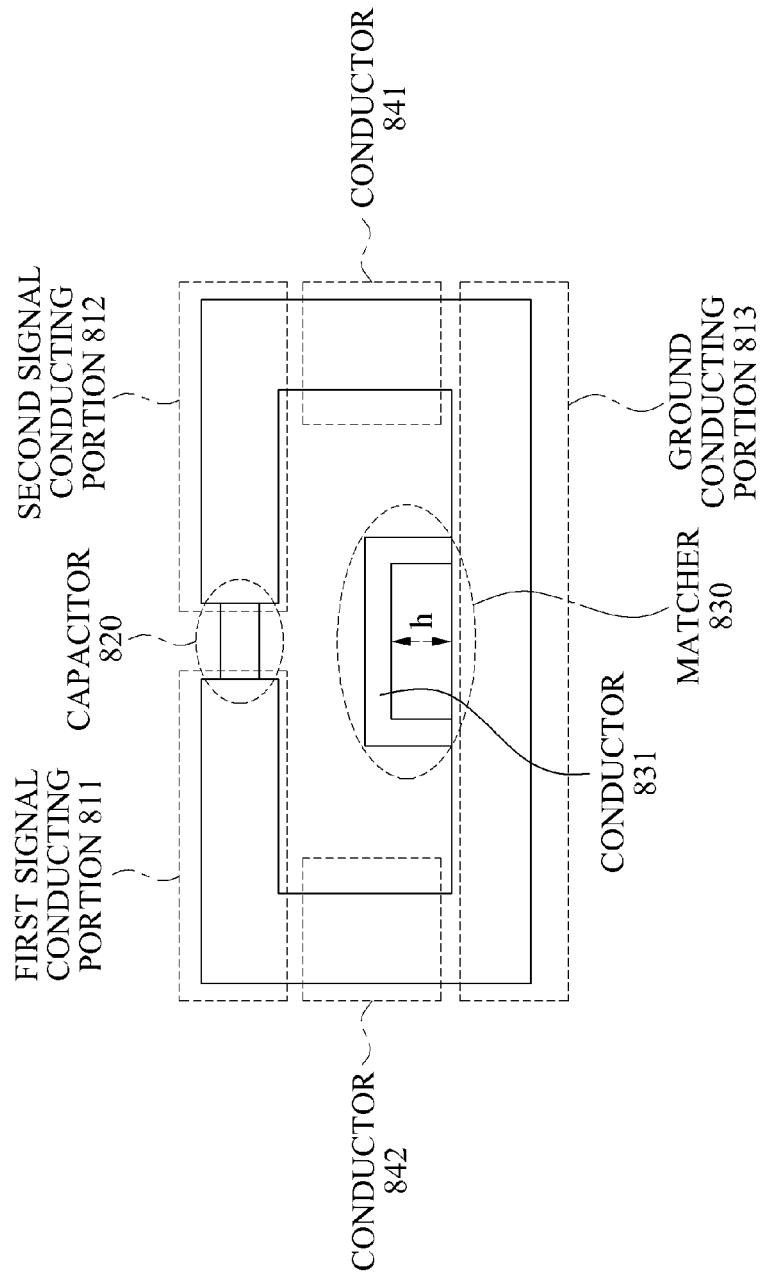
FIGS. 8 through 14 are diagrams illustrating various resonators.

The magnetic permeability may indicate a ratio between a magnetic flux density occurring with respect to a given magnetic field in a corresponding material and a magnetic flux density occurring with respect to the given magnetic field in a vacuum state. The permittivity indicates a ratio between an electric flux density occurring with respect to a given electric field in a corresponding material and an electric flux density occurring with respect to the given electric field in a vacuum state. The magnetic permeability and the permittivity may determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area. FIG. 8 illustrates a resonator 800 having a two-dimensional (2D) structure.

As shown, the resonator 800 having the 2D structure may include a transmission line, a capacitor 820, a matcher 830, and conductors 841 and 842. The transmission line may include, for instance, a first signal conducting portion 811, a second signal conducting portion 812, and a ground conducting portion 813.

The capacitor 820 may be inserted or otherwise positioned in series between the first signal conducting portion 811 and the second signal conducting portion 812 so that an electric field may be confined within the capacitor 820. In various implementations, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded. As shown in FIG. 8, the resonator 800 may be configured to have a generally 2D structure. The transmission line may include the first signal conducting portion 811 and the second signal conducting portion 812 in the upper portion of the transmission line, and may include the ground conducting portion 813 in the lower portion of the transmission line. As shown, the first signal conducting portion 811 and the second signal conducting portion 812 may be disposed to face the ground conducting portion 813 with current flowing through the first signal conducting portion 811 and the second signal conducting portion 812.

In some implementations, one end of the first signal conducting portion 811 may be electrically connected (i.e., shorted) to a conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 may have an electrically "closed-loop structure." The term "closed-loop structure" as used herein, may include a polygonal structure, for example, a circular structure, a rectangular structure, or the like that is electrically closed.

The capacitor 820 may be inserted into an intermediate portion of the transmission line. For instance, the capacitor 820 may be inserted into a space between the first signal conducting portion 811 and the second signal conducting portion 812. The capacitor 820 may be configured, in some instances, as a lumped element, a distributed element, or the like. For example, a distributed capacitor may be configured as a distributed element and may include zigzagged conductor lines and a dielectric material having a relatively high permittivity between the zigzagged conductor lines.

When the capacitor 820 is inserted into the transmission line, the resonator 800 may have a property of a metamaterial, as discussed above. For example, the resonator 800 may have a negative magnetic permeability due to the capacitance of the capacitor 820. If so, the resonator 800 may also be referred to as a mu negative (MNG) resonator. Various criteria may be applied to determine the capacitance of the capacitor 820. For example, the criteria for enabling the resonator 800 to have the characteristic of the metamaterial may include one or more of the following: a criterion for enabling the resonator 800 to have a negative magnetic permeability in a target frequency, a criterion for enabling the resonator 800 to have a zeroth order resonance characteristic in the target frequency, or the like. The resonator 800, which may also be referred to as the MNG resonator 800, may also have a zeroth order resonance characteristic (i.e., having, as a resonance frequency, a frequency when a propagation constant is "0"). If the resonator 800 has a zeroth order resonance characteristic, the resonance frequency may be independent with respect to a physical size of the MNG resonator 800. Moreover, by appropriately designing (or configuring) the capacitor 820, the MNG resonator 800 may sufficiently change the resonance frequency without substantially changing the physical size of the MNG resonator 800.

In a near field, for instance, the electric field may be concentrated on the capacitor 820 inserted into the transmission line. Accordingly, due to the capacitor 820, the magnetic field may become dominant in the near field. In one or more embodiments, the MNG resonator 800 may have a relatively high Q-factor using the capacitor 820 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 800 may include a matcher 830 for impedance-matching. The matcher 830 may be configured to appropriately determine and adjust the strength of the magnetic field of the MNG resonator 800. Depending on the configuration, current may flow in the MNG resonator 800 via a connector, or may flow out from the MNG resonator 800 via the connector. The connector may be connected to the ground conducting portion 813 or the matcher 830. In some instances, the power may be transferred through coupling without using a physical connection between the connector and the ground conducting portion 813 or the matcher 830.

As shown in FIG. 8, the matcher 830 may be positioned within the loop formed by the loop structure of the resonator 800. The matcher 830 may be configured to adjust the impedance of the resonator 800 by changing the physical shape of the matcher 830. For example, the matcher 830 may include the conductor 831 for the impedance-matching positioned in a location that is separate from the ground conducting portion 813 by a distance h. The impedance of the resonator 800 may be changed by adjusting the distance h.

In some instances, a controller may be provided to control the matcher 830 which generates and transmits a control signal to the matcher 830 directing the matcher to change its physical shape so that the impedance of the resonator may be adjusted. For example, the distance h between a conductor 831 of the matcher 830 and the ground conducting portion 813 may be increased or decreased based on the control signal. The controller may generate the control signal based on various factors.

As shown in FIG. 8, the matcher 830 may be configured as a passive element such as the conductor 831, for example. Of course in other embodiments, the matcher 830 may be configured as an active element such as a diode, a transistor, or the like. If the active element is included in the matcher 830, the active element may be driven based on the control signal generated by the controller, and the impedance of the resonator 800 may be adjusted based on the control signal. For example, when the active element is a diode included in the matcher 830, the impedance of the resonator 800 may be adjusted depending on whether the diode is in an ON state or in an OFF state.

In some instances, a magnetic core may be further provided to pass through the MNG resonator 800. The magnetic core may perform a function of increasing a power transmission distance.

Figure 9:
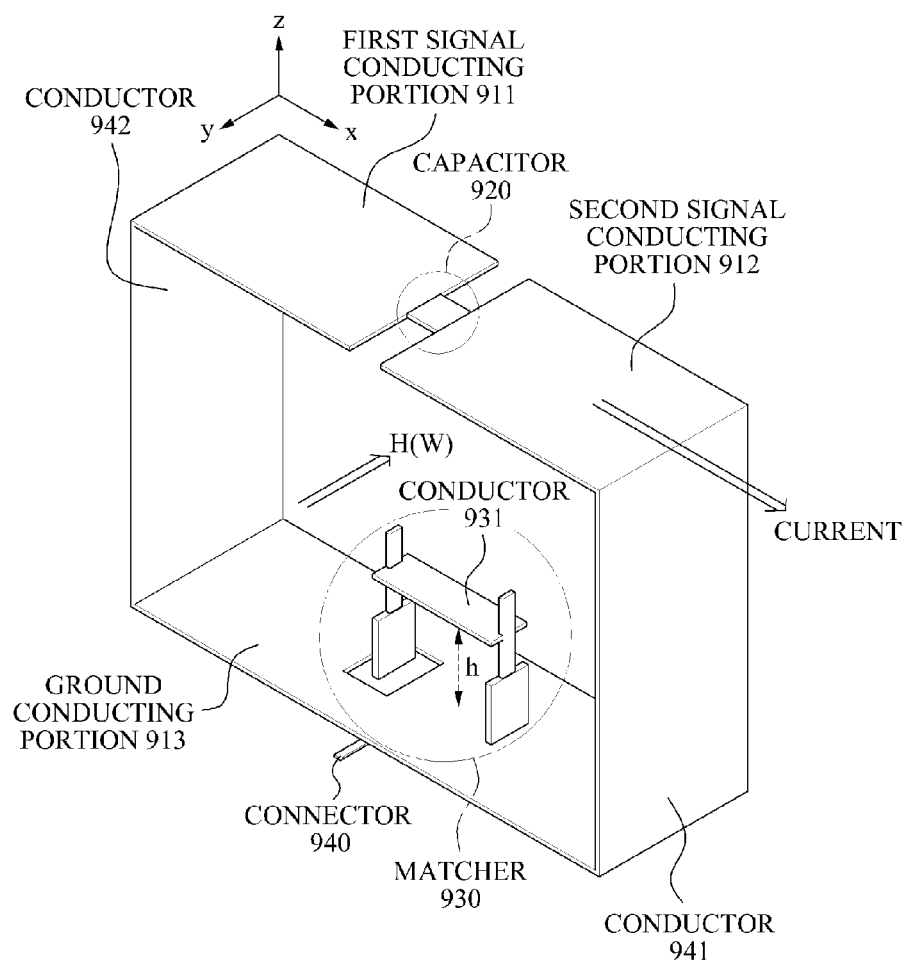

FIG. 9 illustrates a resonator 900 having a three-dimensional (3D) structure.

Referring to FIG. 9, the resonator 900 having the 3D structure may include a transmission line and a capacitor 920. The transmission line may include a first signal conducting portion 911, a second signal conducting portion 912, and a ground conducting portion 913. The capacitor 920 may be inserted, for instance, in series between the first signal conducting portion 911 and the second signal conducting portion 912 of the transmission link such that an electric field may be confined within the capacitor 920.

As shown in FIG. 9, the resonator 900 may have a generally 3D structure. The transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may be disposed to face the ground conducting portion 913. In this arrangement, current may flow in an x direction through the first signal conducting portion 911 and the second signal conducting portion 912. Due to the current, a magnetic field H(W) may be formed in a −y direction. However, it will be appreciated that the magnetic field H(W) might also be formed in other directions (e.g., a +y direction) in other implementations.

In one or more embodiments, one end of the first signal conducting portion 911 may be electrically connected (i.e., shorted) to a conductor 942, and another end of the first signal conducting portion 911 may be connected to the capacitor 920. One end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically closed-loop structure. As shown in FIG. 9, the capacitor 920 may be inserted or otherwise positioned between the first signal conducting portion 911 and the second signal conducting portion 912. For example, the capacitor 920 may be inserted into a space between the first signal conducting portion 911 and the second signal conducting portion 912. The capacitor 920 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 920 is inserted into the transmission line, the resonator 900 may have a property of a metamaterial, in some instances, as discussed above.

For example, when the capacitance of the capacitor inserted as the lumped element is appropriately determined, the resonator 900 may have the characteristic of the metamaterial. And when the resonator 900 has a negative magnetic permeability by appropriately adjusting the capacitance of the capacitor 920, the resonator 900 may also be referred to as an MNG resonator. Various criteria may be applied to determine the capacitance of the capacitor 920. For example, the criteria may include one or more of the following: a criterion for enabling the resonator 900 to have the characteristic of the metamaterial, a criterion for enabling the resonator 900 to have a negative magnetic permeability in a target frequency, a criterion enabling the resonator 900 to have a zeroth order resonance characteristic in the target frequency, or the like. Based on at least one criterion among the aforementioned criteria, the capacitance of the capacitor 920 may be determined.

The resonator 900, which may also be referred to as the MNG resonator 900, may have a zeroth order resonance characteristic (i.e., having, as a resonance frequency, a frequency when a propagation constant is "0"). If the resonator 900 has a zeroth order resonance characteristic, the resonance frequency may be independent with respect to a physical size of the MNG resonator 900. Thus, by appropriately designing (or configuring) the capacitor 920, the MNG resonator 900 may sufficiently change the resonance frequency without changing the physical size of the MNG resonator 900.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. And, since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant.

Also, the MNG resonator 900 may include a matcher 930 for impedance-matching. The matcher 930 may be configured to appropriately adjust the strength of magnetic field of the MNG resonator 900. The impedance of the MNG resonator 900 may be determined by the matcher 930. In one or more embodiments, current may flow in the MNG resonator 900 via a connector 940, or may flow out from the MNG resonator 900 via the connector 940. And the connector 940 may be connected to the ground conducting portion 913 or the matcher 930.

As shown in FIG. 9, the matcher 930 may be positioned within the loop formed by the loop structure of the resonator 900. The matcher 930 may be configured to adjust the impedance of the resonator 900 by changing the physical shape of the matcher 930. For example, the matcher 930 may include the conductor 931 for the impedance-matching in a location separate from the ground conducting portion 913 by a distance h. The impedance of the resonator 900 may be changed by adjusting the distance h.

In some implementations, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may increase or decrease based on the control signal. Accordingly, the physical shape of the matcher 930 may be changed such that the impedance of the resonator 900 may be adjusted. The distance h between the conductor 931 of the matcher 930 and the ground conducting portion 913 may be adjusted using a variety of schemes. As one example, a plurality of conductors may be included in the matcher 930 and the distance h may be adjusted by adaptively activating one of the conductors. Alternatively or additionally, the distance h may be adjusted by adjusting the physical location of the conductor 931 up and down. For instance, the distance h may be controlled based on the control signal of the controller. The controller may generate the control signal using various factors. As shown in FIG. 9, the matcher 930 may be configured as a passive element such as the conductor 931, for instance. Of course, in other embodiments, the matcher 930 may be configured as an active element such as a diode, a transistor, or the like. When the active element is included in the matcher 930, the active element may be driven based on the control signal generated by the controller, and the impedance of the resonator 900 may be adjusted based on the control signal. For example, if the active element is a diode included in the matcher 930, the impedance of the resonator 900 may be adjusted depending on whether the diode is in an ON state or in an OFF state.

In some implementations, a magnetic core may be further provided to pass through the resonator 900 configured as the MNG resonator. The magnetic core may perform a function of increasing a power transmission distance.

Figure 10:
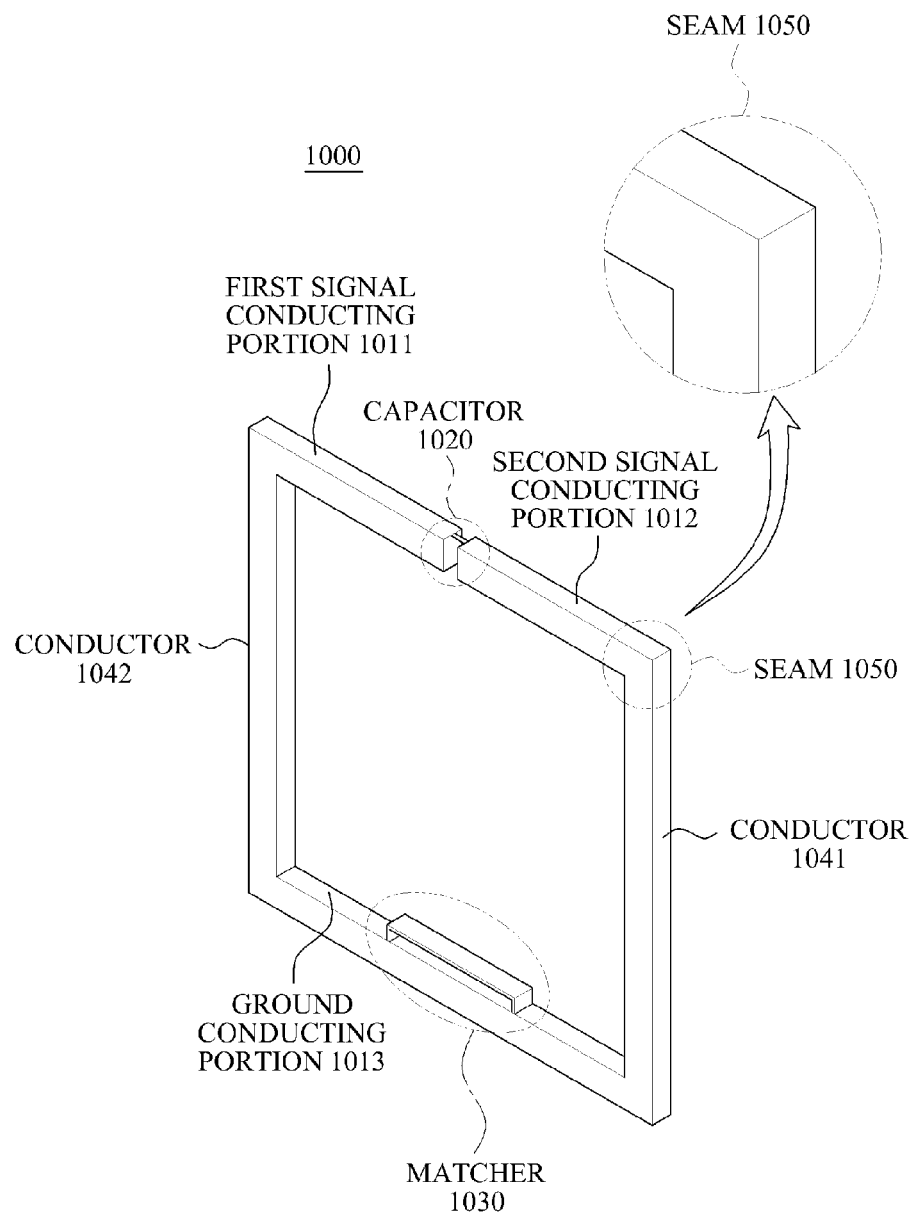

FIG. 10 illustrates a resonator 1000 for a wireless power transmission configured as a bulky type. As used herein, the term "bulky type" may refer to a seamless connection connecting at least two parts in an integrated form. As shown, a first signal conducting portion 1011 and a conductor 1042 may be integrally formed instead of being separately manufactured and thereby be connected to each other. Similarly, the second signal conducting portion 1012 and a conductor 1041 may also be integrally manufactured.

When the second signal conducting portion 1012 and the conductor 1041 are separately manufactured and then are connected to each other, a loss of conduction may occur due to a seam 1050. Thus, in some implementations, the second signal conducting portion 1012 and the conductor 1041 may be connected to each other without using a separate seam (i.e., seamlessly connected to each other). Accordingly, it is possible to decrease a conductor loss caused by the seam 1050. For instance, the second signal conducting portion 1012 and a ground conducting portion 1013 may be seamlessly and integrally manufactured. Similarly, the first signal conducting portion 1011, the conductor 1042 and the ground conducting portion 1013 may be seamlessly and integrally manufactured.

Figure 11:
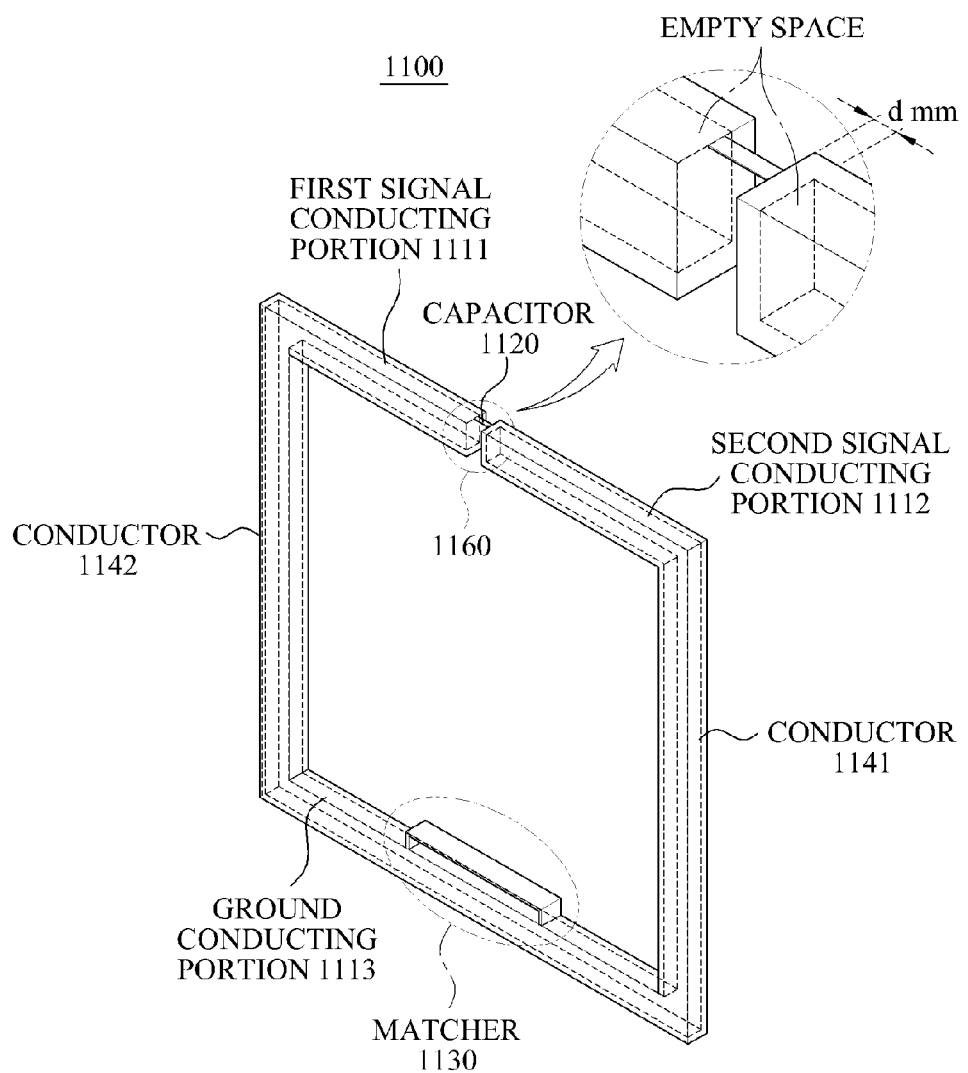

A matcher 1030 may be provided that is similarly constructed as described herein in one or more embodiments. FIG. 11 illustrates a resonator 1100 for a wireless power transmission, configured as a hollow type.

Referring to FIG. 11, one or more of a first signal conducting portion 1111, a second signal conducting portion 1112, a ground conducting portion 1113, and conductors 1141 and 1142 of the resonator 1100 configured as the hollow type structure. As used herein the term "hollow type" refers to a configuration that may include an empty space inside.

For a given resonance frequency, an active current may be modeled to flow in only a portion of the first signal conducting portion 1111 instead of all of the first signal conducting portion 1111, the second signal conducting portion 1112 instead of all of the second signal conducting portion 1112, the ground conducting portion 1113 instead of all of the ground conducting portion 1113, and the conductors 1141 and 1142 instead of all of the conductors 1141 and 1142. When a depth of each of the first signal conducting portion 1111, the second signal conducting portion 1112, the ground conducting portion 1113, and the conductors 1141 and 1142 is significantly deeper than a corresponding skin depth in the given resonance frequency, it may be ineffective. The significantly deeper depth may, however, increase the weight or the manufacturing costs of the resonator 1100 in some instances Accordingly, for the given resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. When each of the first signal conducting portion 1111, the second signal conducting portion 1112, the ground conducting portion 1113, and the conductors 1141 and 1142 has an appropriate depth deeper than a corresponding skin depth, the resonator 1100 may become lighter, and manufacturing costs of the resonator 1100 may also decrease.

For example, as shown in FIG. 11, the depth of the second signal conducting portion 1112 (as further illustrated in the enlarged view region 1160 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one embodiment, when the first signal conducting portion 1111, the second signal conducting portion 1112, the ground conducting portion 1113, and the conductors 1141 and 1142 are made of a copper and they may have a conductivity of $5.8 \times 10^7$ siemens per meter (S·m−1), the skin depth may be about 0.6 mm with respect to 10 kHz of the resonance frequency and the skin depth may be about 0.006 mm with respect to 100 MHz of the resonance frequency. A capacitor 1120 and a matcher 1130 may be provided that are similarly constructed as described herein in one or more embodiments.

Figure 12:
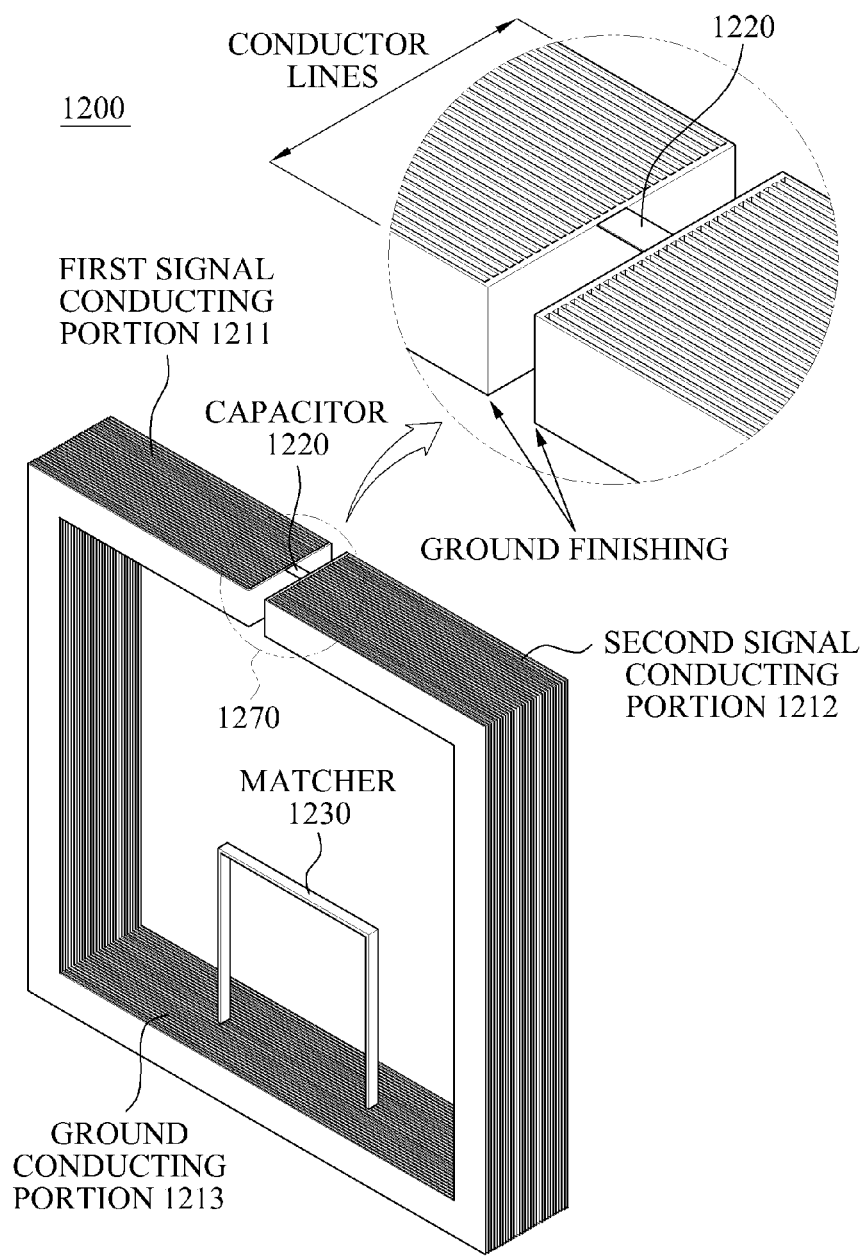

FIG. 12 illustrates a resonator 1200 for a wireless power transmission using a parallel-sheet.

Referring to FIG. 12, the parallel-sheet may be applicable to each of a first signal conducting portion 1211 and a second signal conducting portion 1212 included in the resonator 1200.

One or both of first signal conducting portion 1211 and the second signal conducting portion 1212 may not be a perfect conductor and thus, may have an inherent resistance. Due to this resistance, an ohmic loss may occur. The ohmic loss may decrease a Q-factor and also decrease a coupling effect.

By applying the parallel-sheet to the first signal conducting portion 1211 and the second signal conducting portion 1212, it may be possible to decrease the ohmic loss, and to increase the Q-factor and the coupling effect. Referring to the enlarged view portion 1270 indicated by a circle, when the parallel-sheet is applied, each of the first signal conducting portion 1211 and the second signal conducting portion 1212 may include a plurality of conductor lines. The plurality of conductor lines may be disposed in parallel, and may be electrically connected (i.e., shorted) at an end portion of each of the first signal conducting portion 1211 and the second signal conducting portion 1212.

When the parallel-sheet is applied to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

A capacitor 1220 and a matcher 1230 positioned on the ground conducting portion 1213 may be provided that are similarly constructed as described herein in one or more embodiments.

Figure 13:
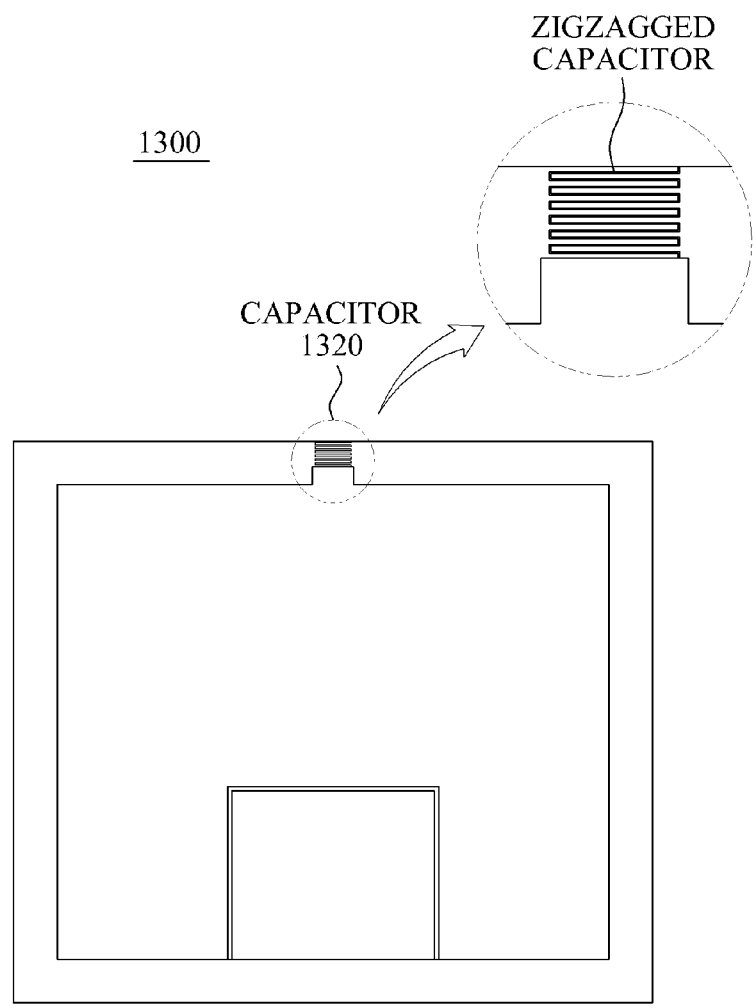

FIG. 13 illustrates a resonator 1300 for a wireless power transmission, including a distributed capacitor.

Referring to FIG. 13, a capacitor 1320 included in the resonator 1300 is configured for the wireless power transmission. A capacitor as a lumped element may have a relatively high equivalent series resistance (ESR). A variety of schemes have been proposed to decrease the ESR contained in the capacitor of the lumped element. According to an embodiment, by using the capacitor 1320 as a distributed element, it may be possible to decrease the ESR. As will be appreciated, a loss caused by the ESR may decrease a Q-factor and a coupling effect.

As shown in FIG. 13, the capacitor 1320 may be configured as a conductive line having the zigzagged structure.

By employing the capacitor 1320 as the distributed element, it may be possible to decrease the loss occurring due to the ESR in some instances. In addition, by disposing a plurality of capacitors as lumped elements, it may be possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 14A:
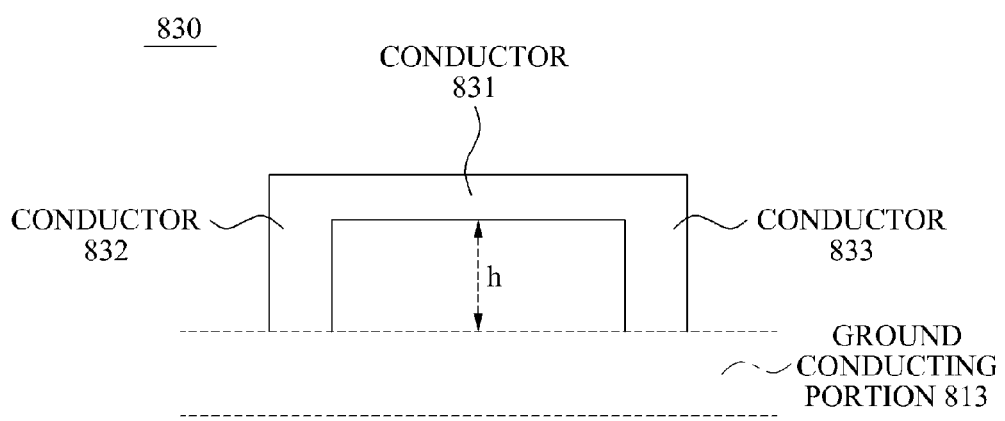
Figure 14B:
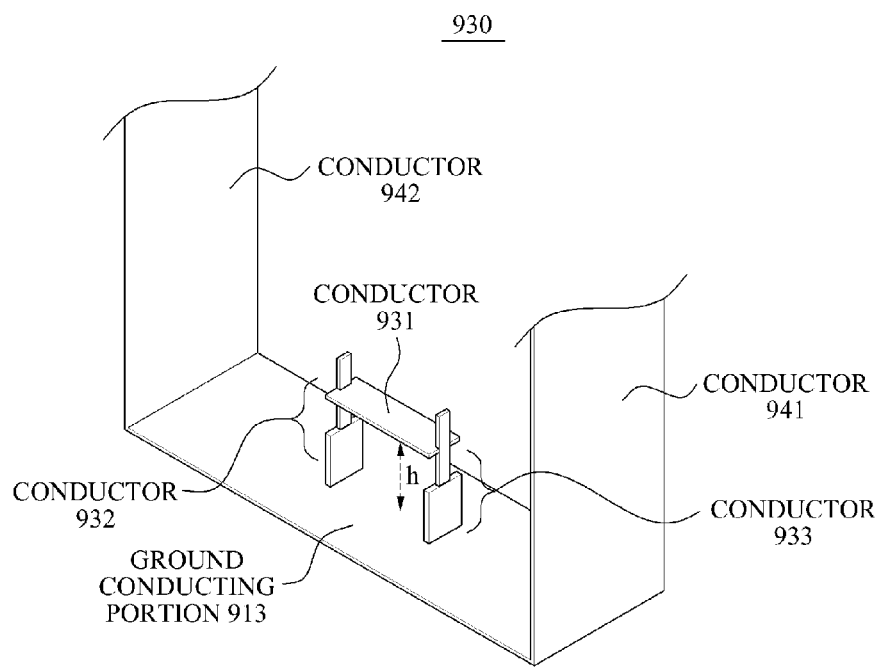

FIG. 14A illustrates one embodiment of the matcher 830 used in the resonator 800 provided in the 2D structure of FIG. 8, and FIG. 14B illustrates one embodiment of the matcher 930 used in the resonator 900 provided in the 3D structure of FIG. 9.

FIG. 14A illustrates a portion of the 2D resonator including the matcher 830, and FIG. 14B illustrates a portion of the 3D resonator of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813, for instance. The distance h between the conductor 831 and the ground conducting portion 813 may be controlled by the controller. The distance h between the conductor 831 and the ground conducting portion 813 may be adjusted using a variety of schemes. For example, the schemes may include one or more of the following: a scheme of adjusting the distance h by adaptively activating one of the conductors 831, 832, and 833, a scheme of adjusting the physical location of the conductor 831 up and down, or the like.

Referring to FIG. 14B, the matcher 930 may include the conductor 931, a conductor 932, a conductor 933 and conductors 941 and 942. The conductors 932 and 933 may be connected to the ground conducting portion 913 and the conductor 931. The conductors 932 and 933 may be connected to the ground conducting portion 913 and the conductor 931. The impedance of the 3D resonator may be determined based on a distance h between the conductor 931 and the ground conducting portion 913. The distance h between the conductor 931 and the ground conducting portion 913 may be controlled by the controller, for example. Similar to the matcher 830 included in the 2D structured resonator, in the matcher 930 included in the 3D structured resonator, the distance h between the conductor 931 and the ground conducting portion 913 may be adjusted using a variety of schemes. For example, the schemes may include one or more of the following: a scheme of adjusting the distance h by adaptively activating one of the conductors 931, 932, and 933, a scheme of adjusting the physical location of the conductor 931 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 15:
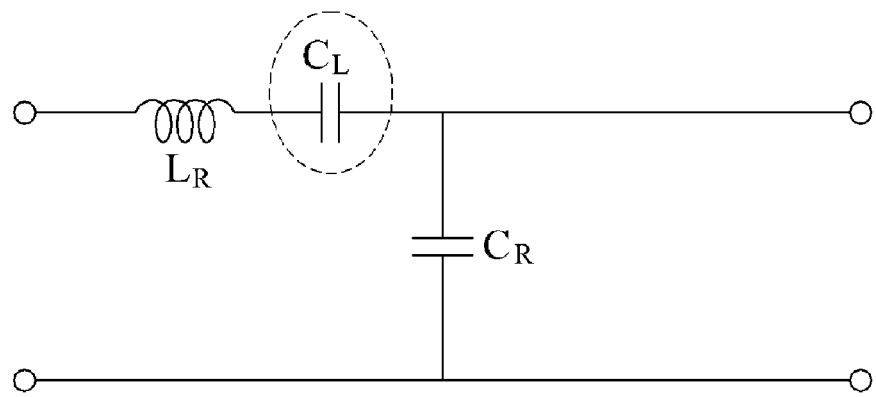
FIG. 15 is a diagram illustrating one equivalent circuit of the resonator for wireless power transmission of FIG. 8.

FIG. 15 illustrates one equivalent circuit of the resonator 800 for the wireless power transmission of FIG. 8.

The resonator 800 of FIG. 8 for the wireless power transmission may be modeled to the equivalent circuit of FIG. 15. In the equivalent circuit depicted in FIG. 15, $L_R$ denotes an inductance of the power transmission line, $C_L$ denotes the capacitor 820 that is inserted in a form of a lumped element in the middle of the power transmission line, and $C_R$ denotes a capacitance between the power transmissions and/or ground of FIG. 8.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \qquad \text{[Equation 2]}$$

In Equation 2, MZR denotes a Mu zero resonator.

Referring to Equation 2, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

One or more embodiments may provide an active rectifier that compensates for a reverse current leakage using a delay locked loop. In some embodiments, a wireless power receiver may use the active rectifier to remove a voltage drop occurring in a passive rectifier. For example, the wireless power receiver may compensate for reverse current leakage occurring in the active rectifier using a delay locked loop. The compensation, using the delay locked loop, for the reverse current leakage may be performed by changing a compensation value based on a change in an inputted AC voltage.

The units described herein may be implemented using hardware components and/or software components in various embodiments. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD- ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An active rectifier comprising:
   a first loop configured to provide a first voltage when a phase of an input signal is positive; and
   a second loop configured to provide a second voltage when the phase of the input signal is negative,
   wherein the first loop comprises:
     a first switch configured to be turned on when the phase of the input signal is positive, based on a differential signal with respect to the input signal,
     a first delay switch to be turned on when the phase of the input signal is positive, based on the differential signal with respect to the input signal,
     a first delay locked loop configured to compensate for a reverse current leakage due to a delay of a switch, between when a phase of the differential signal is switched from positive to negative and when the first delay switch is turned on, by adding a first voltage offset to the phase of the differential signal, and
     a capacitor configured to provide a voltage corresponding to substantially a maximum amplitude of the input signal,
   wherein the first delay switch comprises:
     a comparator configured to receive the differential signal and to output a predetermined voltage when the phase of the differential signal is negative;
     a voltage buffer configured to store the predetermined voltage outputted from the comparator, and, when the stored voltage becomes a turn-on voltage, to output the turn-on voltage; and
     a transistor configured to be turned on by the turn-on voltage outputted from the voltage buffer,
   wherein the first delay locked loop is configured to provide the first voltage offset corresponding to a second delay occurring due to the comparator and the voltage buffer, and to add the first voltage offset to the phase of the differential signal inputted to the comparator, and
   wherein the second loop comprises a second delay locked loop configured to compensate for a reverse current leakage due to a delay of a switch, between when the phase of the input signal is switched from positive to negative and when a second delay switch is turned on, by adding a second voltage offset to the phase of the input signal.

2. The active rectifier of claim 1, wherein the input signal is received from a source resonator through magnetic coupling.

3. The active rectifier of claim 1, wherein the first delay locked loop comprises:

a second comparator configured to receive the differential signal, and to output a predetermined voltage when the phase of the differential signal is negative;
a delay unit configured to receive the output of the voltage buffer, and to output the received output after adding a predetermined delay of the second comparator to the received output;
a phase detecting unit configured to detect a phase difference between an output signal of the second comparator and an output signal of the delay unit;
an electric charge pump configured to provide the voltage offset corresponding to the phase difference; and
a delay compensation unit configured to add the voltage offset to the phase of the differential signal inputted to the comparator.

4. The active rectifier of claim 1, wherein the second loop comprises:
   a second switch configured to be turned on when the phase of the input signal is negative;
   the second delay switch configured to be turned on when the phase of the input signal is negative; and
   a capacitor configured to provide a voltage corresponding to a maximum amplitude of the input signal.

5. The active rectifier of claim 4, wherein the second delay switch comprises:
   a comparator configured to receive the input signal, and to output a predetermined voltage when the phase of the input signal is negative;
   a voltage buffer configured to store the predetermined voltage outputted from the comparator, and, when the stored voltage becomes a turn-on voltage, to output the turn-on voltage; and
   a transistor configured to be turned on by the turn-on voltage outputted from the voltage buffer,
   wherein the second delay locked loop is configured to provide the second voltage offset corresponding to a second delay occurring due to the comparator and the voltage buffer, and to add the second voltage offset to the phase of the input signal inputted to the comparator.

6. The active rectifier of claim 5, wherein the second delay locked loop comprises:
   a second comparator configured to receive the input signal, and to output a second predetermined voltage when the phase of the input signal is negative;
   a delay unit configured to receive the output of the voltage buffer, and to output a received output after adding a predetermined delay of the second comparator to the received output;
   a phase detecting unit configured to detect a phase difference the output signal of the second comparator and the output signal of the delay unit;
   an electric charge pump configured to provide the second voltage offset corresponding to the phase difference; and
   a delay compensation unit configured to add the second voltage offset to the phase of the input signal inputted to the comparator.

7. An active rectifier comprising:
   a first circuit configured to provide a first voltage when a phase of an input signal is positive; and
   a second circuit configured to provide a second voltage when the phase of the input signal is negative,
   wherein the first circuit comprises:
     a switch configured to be turned on when the phase of the input signal is positive, based on a differential signal with respect to the input signal, a delay switch to be turned on when the phase of the input signal is positive, based on the differential signal with respect to the input signal, a first delay locked loop configured to compensate for a reverse current leakage due to a delay of a switch, between when a phase of a differential signal is switched from positive to negative and when the first delay switch is turned on, by adding a first voltage offset to the phase of the differential signal, and a first capacitor configured to provide a voltage corresponding to substantially a maximum amplitude of the input signal, wherein the delay switch comprises:

a comparator configured to receive the differential signal and to output a predetermined voltage when the phase of the differential signal is negative;

a voltage buffer configured to store the predetermined voltage outputted from the comparator, and, when the stored voltage becomes a turn-on voltage, to output the turn-on voltage; and a transistor configured to be turned on by the turn-on voltage outputted from the voltage buffer, wherein the delay locked circuit is configured to provide the first or second voltage offset corresponding to a second delay occurring due to the comparator and the voltage buffer, and to add the first or second voltage offset to the phase of the differential signal inputted to the comparator, and wherein the second circuit comprises:

a second delay locked loop configured to compensate for a reverse current leakage due to a delay of a switch, between when the phase of the input signal is switched from positive to negative and when a second delay switch is turned on, by adding a second voltage offset to the phase of the input signal, and a second capacitor configured to provide a voltage corresponding to substantially a maximum amplitude of the input signal.

8. The active rectifier of claim 7, wherein the at least one switch comprises a transistor.

9. The active rectifier of claim 8, wherein the transistor comprises a PMOS or NMOS transistor.

10. The active rectifier of claim 7, wherein the delay locked circuit comprises:

a second comparator configured to receive the differential signal, and to output a second predetermined voltage when the phase of the differential signal is negative;

a delay unit configured to receive the output of the voltage buffer, and to output a received output after adding a predetermined delay of the second comparator to the received output;

a phase detecting unit configured to detect a phase difference between the output signal of the second comparator and the output signal of the delay unit;

an electric charge pump configured to provide the first voltage offset corresponding to the phase difference; and a delay compensation unit configured to add the first voltage offset to the phase of the differential signal inputted to the comparator.

11. An electronic device comprising the active rectifier of claim 7.

12. The active rectifier of claim 1, wherein the first and second loops include the first delay locked loop and the second delay locked loop, respectively, which are configured to compensate for a reverse current leakage, using the first or second voltage offset corresponding to a delay obtained using the first delay locked loop and the second delay locked loop.

13. An active rectifier comprising:

a first loop configured to provide a first voltage when the phase of an input signal is positive; and a second loop, separate and distinct from the first loop, configured to provide a second voltage when the phase of the input signal is negative, wherein the first loop comprises:

a first switch configured to be turned on when the phase of the input signal is positive, based on a differential signal with respect to the input signal, a first delay switch to be turned on when the phase of the input signal is positive, based on the differential signal with respect to the input signal, and a capacitor configured to provide a voltage corresponding to substantially a maximum amplitude of the input signal, wherein the first delay switch comprises:

a comparator configured to receive the differential signal and to output a predetermined voltage when the phase of the differential signal is negative; a voltage buffer configured to store the predetermined voltage outputted from the comparator, and, when the stored voltage becomes a turn-on voltage, to output the turn-on voltage; and a transistor configured to be turned on by the turn-on voltage outputted from the voltage buffer, wherein the first loop comprises a first delay locked loop configured to compensate for a reverse current leakage due to a delay of the transistor and provide the first voltage offset corresponding to a second delay occurring due to the comparator and the voltage buffer, and to add the first voltage offset to the phase of the differential signal inputted to the comparator, and wherein the second loop comprises a second delay locked loop configured to compensate for a reverse current leakage due to a delay of a switch, between when the phase of the input signal is switched from positive to negative and when a second delay switch is turned on, by adding a second voltage offset to the phase of the input signal.

* * * * *